Aug. 17, 1965   J. MACATICIAN   3,200,748
GYROSCOPIC CONTROL SYSTEM
Filed Nov. 16, 1959

INVENTOR
JOHN MACATICIAN
BY [signature]
his AGENT

United States Patent Office 3,200,748
Patented Aug. 17, 1965

3,200,748
GYROSCOPIC CONTROL SYSTEM
John Macatician, Lake Hopatcong, N.J., assignor to Thiokol Chemical Corporation, Bristol, Pa., a corporation of Delaware
Filed Nov. 16, 1959, Ser. No. 853,420
17 Claims. (Cl. 102—50)

This invention relates generally to guidance systems and more particularly to a system which utilizes the inertial forces of rotating masses to deflect or guide a rocket missile, and is also applicable to rocket and jet aircraft.

The main object of the present invention is to provide a gyroscopic control system for missiles which utilizes the mass of the fuel stored aboard for propulsion to produce the necessary guidance torques.

An important object of the present invention is to provide a gyroscopic control system for missiles in which the propulsion fuel is pumped through both pitch and yaw gyros whose axes may be varied by an information gyro system.

Another important object of the present invention is to provide a gyroscopic control system for missiles wherein guidance is initiated by an information gyro system which contains pre-set information and directs actuators responsive to servo amplifiers which deflect the axes of the gyros which precess, redirecting the missile, until the reorientation of the information gyros is satisfied.

Other objects and advantages of the present invention will become apparent during the course of the following description.

In the drawings I have shown several embodiments of the invention. In these showings:

In the system first described, guidance is afforded only as to pitch and yaw. The forces of precession are a function of the speed of fluid circulation (by circulation pumps which are fed by gyro sensing) and the fixed rotational earth velocity of 15 minutes angle per minute time. Thus, missile directional change is directly related to fluid velocity and is the controlling variable when in flight.

Figure 1:
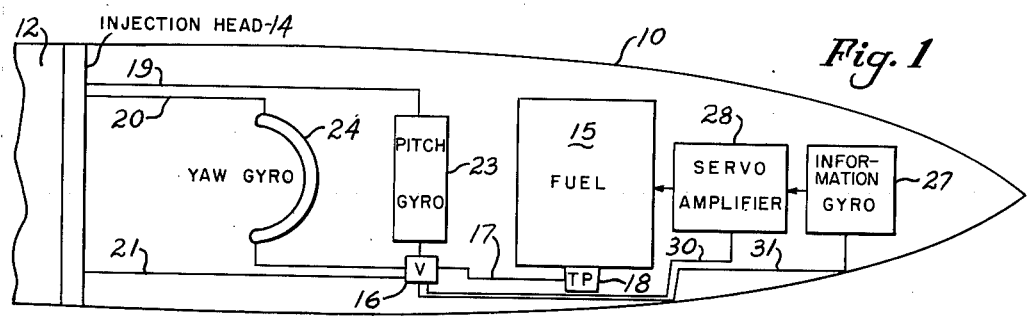
FIGURE 1 is a fragmentary longitudinal schematic view of one form of the invention.

Referring to FIGURE 1 of the drawings, numeral 10 designates a missile propelled by a rocket motor 12 having a fuel injection head 14. Propellant fuel is pumped from a fuel tank 15 to a 3-way hydraulic valve 16 through a conduit 17 by a turbine pump 18. The 3-way valve 16 is connected with the injector head 14 by three conduits 19, 20, and 21 and functions to meter fuel to any one or all of the three conduits.

The conduit 19 includes a circular portion 23 comprising the pitch gyro, the conduit 20 includes a circular portion comprising the yaw gyro 24 arranged at right angles to the pitch gyro 23, and the conduit 21 connects directly with the injection head 14.

The closed servo loop thus consists of information gyros in both pitch and yaw which send error signals to servo amplifiers 28 which send them to the 3-way valve 16 by means of the electrical conduit 30. Reorientation of the missile 10 is due to fluid (fuel) circulation through the main pitch and yaw gyros 23, 24 and the fact of reorientation is sensed by the information gyros 27 which then cease to pass on any error signals to the valve 16.

Figure 2:
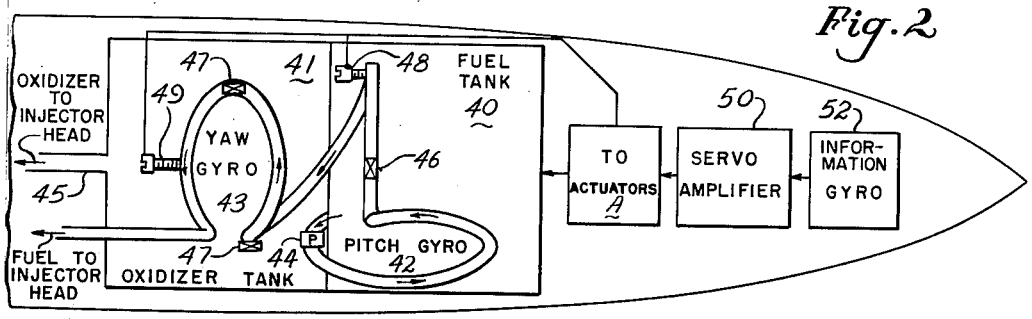
FIGURE 2 is a similar view of another form of the invention.

In the form of the invention disclosed in FIGURE 2 of the drawings, the guidance system utilizes the fuel and oxidizer of a bipropellant rocket system as the gyro angular momentum generating medium. The fuel and oxidizer are stored in tanks 40, 41 and connected conduits including circular paths are respectively placed in the pitch and yaw planes of and within the tanks 40, 41 to comprise the pitch and yaw gyros 42, 43 when fuel is flowing through them.

A pump 44 withdraws fuel from the tank 40 and pumps it first through the pitch gyro 42 and then through the yaw gyro 43 from whence it passes to the injection head to which the oxidizer passes directly by a conduit 45. The circular tubes comprising the pitch and yaw gyros 42 and 43 are each respectively supported by diametrically disposed gimbals 46, 47 anchored to the frame of the missile and by hydraulic servo actuators 48, 49.

The input torque to the pitch and yaw gyros through which the fuel passes in series is induced by the servo actuators 48, 49 which are directed by a servo amplifier 50 which is in turn directed by an information gyro system 52 which has programmed into it the necessary guidance information. The placing of the pitch and yaw gyros in the tanks 40, 41 in which they are initially immersed is a substantial space saver as is the use of the fuel in the gyros rather than a separate liquid.

In operation, the guidance system as shown in FIGURE 2 completes its necessary guidance in seconds after ignition. The pumping of the fuel through the pitch and yaw gyros at take-off assures stability of the rocket because of the gyroscopic action of the fuel flowing in circular paths. When guidance is initiated by the information gyro 52 which contains pre-set information, the actuators 48 and 49 are responsive to the servo amplifiers 50 and deflect the axes of the gyros 42 and 43 which then precess, redirecting the missile, until the reorientation of the information gyros 52 is satisfied.

Guidance is, of course, terminated when the fuel has been expended in each of the forms of the invention and it will be understood that the rocket exhaust is coaxial with the missile frame and that the thrust vector passes through the center of mass of the missile.

Figure 3:
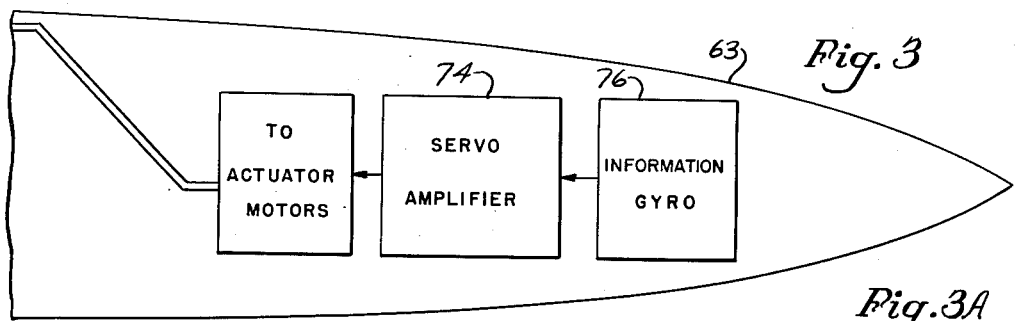
FIGURES 3 and 3A are a similar view of a further form of the invention.
Figure 3A:
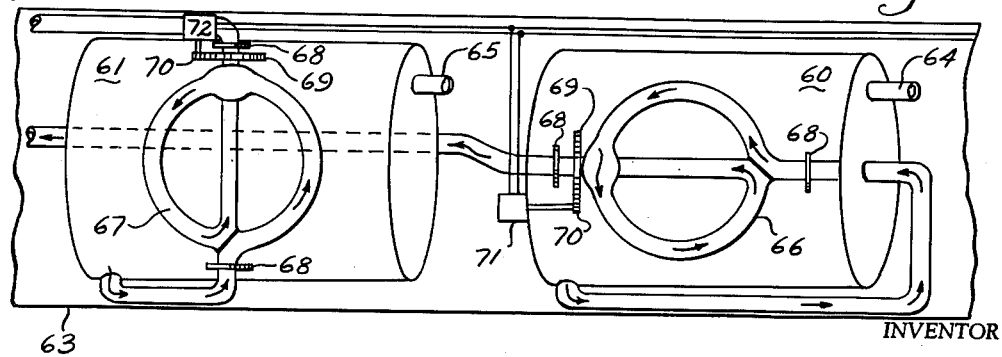

In the form of the invention shown in FIGURES 3, 3A, the fuel and oxidizer tanks 60 and 61 are fixed to the frame of the missile 63 which is initially oriented vertical to the surface of the earth. Gas pressurization is admitted through the conduits 64 and 65 into the tanks 60 and 61 forcing fuel and oxidizer respectively through the circular paths of the conduits 66 and 67 forming the pitch and yaw gyros.

Both of the gyros have rotating seals 68 but inasmuch as the same fluid is on both sides of the seal and the differential pressure is very small, leakage past the seal is unimportant. A gear 69 is attached to each of the rotatable gyros 66 and 67 and each is driven by a worm gear 70 mounted on the shafts of a pair of motors 71 and 72.

As will be apparent, reorientation of the missile 63 is effected by the action of the motors 71 and 72 in turning the planes of the fluid mass gyros 66 and 67 which results in a torque couple applied to the rotary seals 68 by virtue of the force of precession.

The corrective guidance signals applied to the motors 71 and 72 come from the amplifiers 74 which are controlled by small information gyros 76 which do not have the mass needed to mechanically reorientate the missile frame.

The forms of the invention described are ideal for missiles of almost any type and particularly for those launched into a controlled orbit for the guidance control terminates at burnout and the control mass required in a gyro to perform corrective functions is completely consumed thus eliminating the usual dead weight of the mass gyro.

It is to be understood that the forms of the inventions herewith shown and described are to be taken as preferred examples of the same and that various changes in the shape, size and arrangement of parts may be resorted to without departure from the spirit of the invention or the scope of the subjoined claims.

I claim:

1. In a guidance system for missiles having a propelling motor and fuel storage means including a conduit for supplying fuel to the motor; a pair of circular paths arranged in the conduit in planes at right angles to each other, and means mounted in the missile for forcing fuel from the storage means to the motor unidirectionally through said circular paths to form constant fluid mass stabilizing gyros thereof, the guidance torque of said gyros terminating upon exhaustion of the fuel.

2. A device as recited in claim 1 wherein information gyros are mounted in the missile and are operatively connected with said stabilizing gyros to vary their stabilizing effect during operation of the motor.

3. A device as recited in claim 1 wherein information gyros are mounted in the missile and are operatively connected with said stabilizing gyros to simultaneously vary their stabilizing effect during operation of the motor.

4. A device as recited in claim 1 wherein information gyros are mounted in the missile and are operatively connected with said stabilizing gyros to individually vary their stabilizing effect during operation of the motor.

5. A device as recited in claim 1 wherein said circular paths are disposed in the fuel storage means.

6. A device as recited in claim 1 wherein means are provided for varying the planes of said circular paths with respect to the axis of the missile.

7. In a guidance system for missiles having a propelling motor and fuel storage means including a conduit for supplying fuel to the motor; a valve arranged in the conduit, a second conduit including a circular path connecting said valve and the motor, a third conduit connecting said valve and the motor and including a circular path arranged in a plane at right angles to the plane of the circular path of said second conduit, and means mounted in the missile for forcing fuel from the storage means through said valve and to the motor unidirectionally through said conduits and said circular paths to form constant fluid mass stabilizing gyros thereof, the guidance torque of said gyros terminating upon exhaustion of the fuel.

8. A device as recited in claim 7 wherein information gyros are mounted in the missile and are operatively connected with said valve to vary the amount of fuel passing through said second and third conduits to vary the effect of the stabilizing gyros.

9. In a guidance system for missiles having a propelling motor and liquid fuel and oxidizer storage means including conduits between the storage means and the motor for supplying fuel and oxidizer to the motor; a pair of circular paths arranged in one of the conduits in planes at right angles to each other, and means mounted in the missile for forcing liquid from the storage means to the motor unidirectionally through said circular paths to form constant fluid mass stabilizing gyros thereof, the guidance torque of said gyros terminating upon exhaustion of the fuel.

10. A device as recited in claim 9 wherein said circular paths are disposed within the storage means.

11. A device as recited in claim 9 wherein means are provided for simultaneously varying the planes of said circular paths with respect to the axis of the missile.

12. A device as recited in claim 9 wherein means are provided for separately varying the planes of said circular paths with respect to the axis of the missile.

13. In a guidance system for missiles having a propelling motor and liquid fuel and oxidizer storage means including separate conduits for supplying fuel and oxidizer to the motor; a circular path arranged in each of the conduits at right angles to each other, and means arranged in the missile for forcing fuel and oxidizer to the motor unidirectionally through the separate conduits and said circular paths to form constant fluid mass stabilizing gyros of the latter, the guidance torque of said gyros terminating upon exhaustion of the fuel and oxidizer.

14. A device as recited in claim 13 wherein information gyros are mounted in the missile and are operably connected with said stabilizing gyros to vary their stabilizing effect during operation of the motor.

15. A device as recited in claim 13 wherein the circular path area of said conduits is rotatably mounted, and means are provided to effect rotary movement of said conduits.

16. A device as recited in claim 15 wherein said circular paths are disposed within the storage means.

17. A device as recited in claim 13 wherein said circular paths are disposed within the storage means.

References Cited by the Examiner

UNITED STATES PATENTS

| | | | |
|---|---|---|---|
| 2,856,142 | 10/58 | Haviland | 244—14 |
| 2,911,912 | 11/59 | Wetherbee | 102—50 |
| 2,960,876 | 11/60 | Saphra | 74—5.7 |
| 2,980,363 | 4/61 | Schonstedt | 244—14 |

OTHER REFERENCES

Machine Design, March 1955, page 151.

SAMUEL FEINBERG, *Primary Examiner.*

FREDERICK M. STRADER, CHESTER L. JUSTUS,
*Examiners.*